Sept. 23, 1924.
J. A. MARTOCELLO
1,509,520
AIR VALVE AND NOZZLE
Filed Nov. 16, 1921
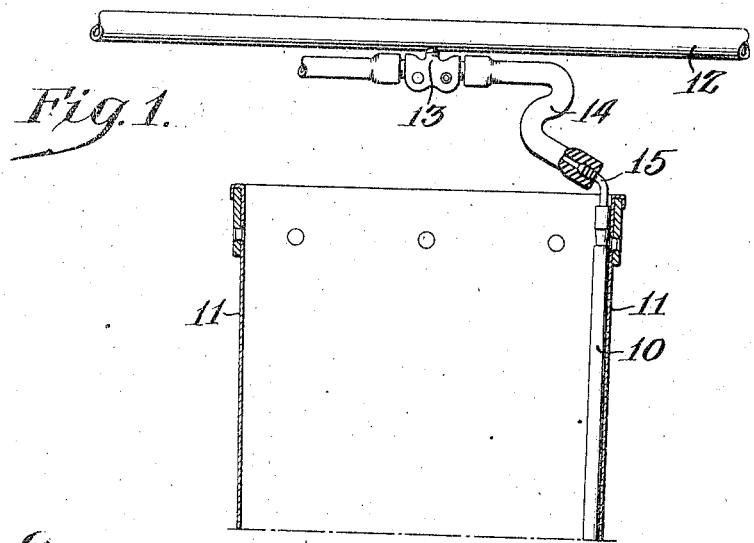
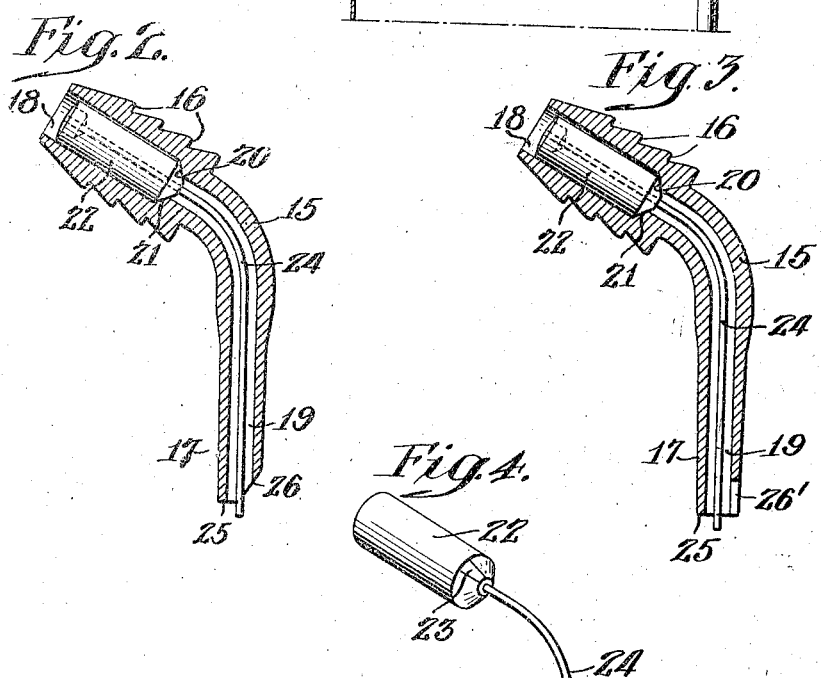
Witness:
Walter Chism
Inventor:
Joseph A. Martocello.
by Steell
Attorney.

Patented Sept. 23, 1924.

1,509,520

UNITED STATES PATENT OFFICE.

JOSEPH A. MARTOCELLO, OF PHILADELPHIA, PENNSYLVANIA.

AIR VALVE AND NOZZLE.

Application filed November 16, 1921. Serial No. 515,650.

*To all whom it may concern:*

Be it known that I, JOSEPH A. MARTOCELLO, a citizen of the United States, residing at Philadelphia, in the county of Philadelphia and State of Pennsylvania, have invented a certain new and useful Air Valve and Nozzle, of which the following is a specification.

My invention relates to valves and nozzies used to feed air from air laterals to the circulation pipes of ice cans for raw water ice-making systems.

The purpose of my invention is to provide a simple and inexpensive combined valve and nozzle, provided with convenient and reliable means for opening the valve to blow out the impurities.

A further purpose is to provide a valve with an opening of size to pass through it continuously a proper quantity of air and with a valve extension, preferably through the valve nozzle, whereby the valve may be unseated for blow-off purposes.

A further purpose is to hold the valve in place by a wire through which the valve is unseated for removal of accumulated impurities.

Further purposes will appear in the specification and in the claims.

I have preferred to illustrate my invention by but one general form, selecting a form which is simple, practical and inexpensive and which at the same time well illustrates the principles of my invention.

Figure 1 is a vertical section showing an ice can and connections to it from the air lateral including my invention.

Figures 2 and 3 are longitudinal sections of different forms of valve and nozzle preferred by me.

Figure 4 is a perspective view of the valve and wire removed from the nozzle.

In the drawings similar numerals indicate like parts.

I have shown my invention as applied to an air circulation system in which the circulation pipe 10 is permanently attached to the can 11 and which is suitable for high pressure air circulation. However, it will be obvious that the invention is applicable also to systems in which a removable pipe is used and in which the pressure is low or intermediate.

The air from the lateral 12 passes through any suitable outlet 13 and flexible pipe 14 to the nozzle 15 by which connection is made with the air pipe 10. The outlet may carry a valve if desired.

The character of the engagement of the nozzle with the flexible pipe, as by means of a roughened or ratched surface 16 at the one terminal or with the pipe 10 by means of the other (tapered) terminal 17 is not material to my invention.

For convenience the fitting carrying the nozzle is bent or curved at an intermediate point so that the axis of the inlet bore 18 is at an angle to the axis of the passage or bore 19 through the tapered terminal 17. This avoids excessive bending of the flexible pipe and presents the terminal 17 in convenient position for entry within the upper end of the air pipe 10. It will be obvious, however, that my invention may be applied also to straight fittings.

The inlet bore 18 is larger than the bore 19 of the terminal 17 so that, comparatively the former is a counterbore and thus provides a shoulder 20 which acts as a valve seat about the adjoining bore 19. This seat is preferably conical but in any event operatively conforms to the end 21 of a plug valve 22.

The plug valve is smaller than the bore of the inlet, not only to permit movement within it but also to provide for passage of air between the side walls of the plug valve and the bore respectively, giving a plentiful supply of air for blowing out.

Between the end 21 of the valve and the valve seat constant leakage is provided corresponding to the normal pressure of air for the can. I prefer to secure this leakage by altering the face of the valve rather than by cutting the seat. In the illustration, therefore, the valve does not engage with the seat throughout its entire seating face but is grooved or flattened or otherwise "relieved" at 23 to provide a path free from contact with seat for the predetermined continuous flow of air from the lateral into the pipe 10, notwithstanding that the remainder of the face of the plug valve is pressed tightly against the seat by the pressure of air from the lateral.

From time to time dust and dirt in the air are apt to clog the valve and shut off flow of air to the ice can. I have taken care of this by providing means for unseating the valve, accessible when the nozzle is withdrawn from the pipe 10. The obstruction may thus be blown out by the air blast. For this purpose I supply a wire 24 attached to the plug valve in any suitable way and most desirably projects beyond the end 25 of the nozzle. The wire may, however, merely be accessible from the front of the nozzle. The projection should be short in order that it may not readily be bent over so as to interfere with the insertion of the nozzle within the pipe 10, and I find that I can get along with a smaller projection of the wire 24 if I cut away a part of the pipe to give side access. Of the various ways of doing this I show two in the chamfer or taper at 26, Figure 2 and in the kerf or slot 26' in Figure 3.

The wire permits more free movement of the valve within reasonable limits if it be of spring material, since it can be bent initially to the shape of the passage and will lie within it without side binding or with any desired amount of side binding, whereas a wire without spring will have its shape given to it by engagement with the side walls of the passage and will bind more within the passage. In either event the engagement of the wire with the walls of a "bent" passage caused by withdrawal movement protects the valve from careless or accidental loss. The wire should be of a diameter small enough not to interfere with free movement of air through the passage.

In operation the nozzle is introduced into the pipe of the appropriate can, the air is turned on and by reason of the leakage air is fed through to the can in the predetermined amount.

When there is any appreciable reduction or stoppage of air feed the nozzle is withdrawn from the pipe and the valve is unseated by pressing against the wire 24 either directly, if it projects, as preferred, or by any implement if it be desired to have the wire terminate short of the end of the nozzle. This causes an immediate greatly increased flow of air, removing the obstruction, after which the nozzle is replaced within the pipe. The pressure of the air at the back keeps the valve seated and restricts the air flow to the leakage intended.

It will be obvious that various changes may be made in the manner of constructing my invention, to suit the preference or whim of the designer, without copying my structure and yet securing a part or all of the benefits of my invention. It is my purpose to include herein all such modifications of my invention as come within the spirit and scope of my invention.

Having thus described my invention, what I claim as new and desire to secure by Letters Patent is:—

1. In a device for connecting air laterals and the air circulation pipes of ice making cans, the combination of a nozzle having a bore and a counterbore at the rear to provide a valve seat, a valve therein normally engaging the seat, there being a path free from contact from the perimeter of the valve to the opening surrounded by the valve seat when the valve is in closed position to permit a constant flow of air therethrough and a wire connected with the valve and extending through the nozzle for access from the front of the nozzle to unseat the valve and permit blowing out of the air through the valve.

2. In a device for connecting air laterals and the air circulation pipes of ice making cans, a nozzle having a bore and a counterbore at the rear thereof providing a valve seat, a valve for the seat, there being a path free from contact from the perimeter of the valve to the opening surrounded by the valve seat when the valve is in closed position to permit a constant flow of air therethrough, and a wire connected to the valve and extended through the bore to the end of the nozzle for engagement by the operator to blow out the valve, said end of the nozzle being open laterally so as to provide lateral access to the wire.

3. A combined valve and nozzle for air connection with ice can pipes comprising a valve, a seat having a path free from contact with the valve from the perimeter of the valve to the opening surrounded by the seat in closed position of the valve to permit a constant flow of air therethrough, the valve being adapted to permit an increase of the air flow by rearward movement or opening thereof and a forward extension from said valve within the bore of the nozzle accessible from the front of the nozzle and adapted for opening the valve to blow it out.

4. A combined valve and nozzle for air connection with ice can pipes, having a bore through the nozzle with a counterbore at the rear end thereof, providing a tapered valve seat about the rear end of the bore, a plug valve adapted to fit the tapered seat throughout the greater part of its extent but lacking engagement therewith for a portion thereof to allow constant air flow of less quantity than the flow provided when the valve is open and a forward extension from said valve through the bore allowing free flow of air past the extension and projecting at the forward end of the nozzle to provide for opening movement of the valve.

JOSEPH A. MARTOCELLO.